(12) United States Patent
Koczo et al.

(10) Patent No.: US 7,745,501 B2
(45) Date of Patent: Jun. 29, 2010

(54) METHOD FOR DEMULSIFYING

(75) Inventors: Kalman Koczo, Sufern, NY (US); Sabine Isabelle Azouani, Ferney-Voltaire (FR); Benjamin Falk, Sleepy Hollow, NY (US)

(73) Assignee: Momentive Performance Materials Inc., Albany, NY (US)

( * ) Notice: Subject to any disclaimer, the term of this patent is extended or adjusted under 35 U.S.C. 154(b) by 911 days.

(21) Appl. No.: 11/472,727

(22) Filed: Jun. 22, 2006

(65) Prior Publication Data

US 2007/0299143 A1 Dec. 27, 2007

(51) Int. Cl.
*B01D 17/05* (2006.01)
*C10G 33/04* (2006.01)

(52) U.S. Cl. .................. 516/144; 208/188; 210/708

(58) Field of Classification Search .......... 516/144
See application file for complete search history.

(56) References Cited

U.S. PATENT DOCUMENTS

| | | | |
|---|---|---|---|
| 2,499,368 A | 3/1950 | De Groote et al. | |
| 2,499,370 A | 3/1950 | De Groote et al. | |
| 2,524,889 A | 10/1950 | De Groote et al. | |
| 2,560,333 A | 7/1951 | De Groote et al. | |
| 3,338,867 A | 8/1967 | Plueddemann | |
| 3,677,962 A | 7/1972 | Koerner et al. | |
| 3,907,701 A | 9/1975 | Liebold et al. | |
| 3,974,220 A | 8/1976 | Heiss et al. | |
| 4,183,820 A | 1/1980 | Theile et al. | |
| 4,184,004 A | 1/1980 | Campbell et al. | |
| 4,387,028 A | 6/1983 | Fee | |
| 4,393,199 A * | 7/1983 | Manser ................ | 528/408 |
| 4,427,815 A | 1/1984 | Ona et al. | |
| 4,451,671 A | 5/1984 | Diery et al. | |
| 4,536,339 A | 8/1985 | Ritschel et al. | |
| 4,596,653 A * | 6/1986 | Graham et al. ........... | 208/188 |
| 5,004,559 A | 4/1991 | Koerner et al. | |
| 5,421,993 A | 6/1995 | Hille et al. | |
| 5,463,084 A | 10/1995 | Crivello et al. | |
| 5,891,977 A | 4/1999 | Dietz et al. | |
| 2005/0080221 A1 | 4/2005 | Meyer | |

FOREIGN PATENT DOCUMENTS

| | | |
|---|---|---|
| DE | 10 2004 018926 A1 | 11/2005 |
| EP | 0 141 585 A | 5/1985 |
| EP | 0 427 263 A | 5/1991 |
| EP | 1 010 748 A | 6/2000 |
| GB | 1439793 | 10/1973 |
| WO | WO 97/38067 A | 10/1997 |
| WO | WO 03/085015 A | 10/2003 |

* cited by examiner

*Primary Examiner*—Ling-Siu Choi
*Assistant Examiner*—Chun-Cheng Wang
(74) *Attorney, Agent, or Firm*—Dominick G. Vicari

(57) ABSTRACT

The invention relates to a method for separating emulsions of oil and water, the method comprising incorporating a demulsifying-effective amount of a silicone demulsifier into an emulsion comprising an oil phase and an aqueous phase, the silicone demulsifier having a molecular structure comprising a polysiloxane backbone of at least two siloxane units covalently bound to (i) one or more alkylene oxide groups comprising one or more alkylene oxide units independently having one to five carbon atoms, and (ii) one or more oxirane-containing and/or oxetane-containing groups, wherein said oxirane or oxetane is optionally ring-opened by reaction with a chemical or group capable of ring-opening an oxirane or oxetane ring, respectively, and wherein a solid filler is substantially excluded from the silicone demulsifier and emulsion. The invention also relates to compositions containing the above-described demulsifier and the water and oil phases of an emulsion.

34 Claims, No Drawings

METHOD FOR DEMULSIFYING

BACKGROUND OF THE INVENTION

1. Field of the Invention

The invention relates to silicone demulsifiers of particular use in separating water emulsified in oil.

2. Description of the Prior Art

It is well known that emulsions often cause difficulties in industrial processing operations. For this reason, the emulsified components need to be separated. Often, one or more chemicals, known as demulsifiers, are used for this purpose.

For example, during crude oil processing, it is common place for water to become emulsified in the oil. The emulsified water is problematic from several standpoints, most notably as a corrosive to pipelines and as a disruptor to oil distillation processes. The resulting water-in-oil emulsion is typically highly stable as a result of natural surfactants (e.g., naphthoic acids, asphaltenes, and resins) in the crude oil.

To disrupt the stabilized water-in-oil emulsions in crude oil, specialized demulsifiers have been used. See, for example, U.S. Pat. Nos. 5,004,559, 4,183,820, 3,677,962, and British Patent No. GB 1439793, all of which disclose the use of polyoxyalkylene-polysiloxane copolymers as demulsifiers in crude oil or petroleum processing.

However, there remains a need for demulsifiers capable of breaking and/or separating such emulsions more effectively.

BRIEF DESCRIPTION OF THE INVENTION

These and other objectives have been achieved by providing a method for separating emulsions of oil and water, the method comprising incorporating a demulsifying-effective amount of a silicone demulsifier into an emulsion comprising an oil phase and an aqueous phase, the silicone demulsifier having a molecular structure comprising a polysiloxane backbone of at least two siloxane units covalently bound to (i) one or more alkylene oxide groups comprising one or more alkylene oxide units independently having one to five carbon atoms, and (ii) one or more oxirane-containing and/or oxetane-containing groups, wherein said oxirane or oxetane is optionally ring-opened by reaction with a chemical or group capable of ring-opening an oxirane or oxetane ring, respectively, except that an oxetane ring is not ring-opened with water, and wherein a solid filler is substantially excluded from the silicone demulsifier and emulsion.

In another aspect, the invention relates to compositions comprising:

a) a demulsifying-effective amount of a silicone demulsifier having a molecular structure comprising a polysiloxane backbone of at least two siloxane units covalently bound to (i) one or more alkylene oxide groups comprising one or more alkylene oxide units independently having one to five carbon atoms, and (ii) one or more oxirane-containing and/or oxetane-containing groups, wherein said oxirane or oxetane is optionally ring-opened by reaction with a chemical or group capable of ring-opening an oxirane or oxetane ring, respectively, except that an oxetane ring is not ring-opened with water;

b) an aqueous phase; and c) an oil phase;

wherein a solid filler is substantially excluded from the composition.

The present invention advantageously provides a method for demulsifying emulsions by using oxirane- and oxetane-functionalized alkylene oxide-silicone copolymers. The demulsification method disclosed herein is capable of improving the separation of components in stabilized emulsions while being cost-effective and practical in a variety of industrial operations.

DETAILED DESCRIPTION OF THE INVENTION

In one aspect, the invention is directed to a method for separating the components of an emulsion comprising an oil phase and an aqueous phase. The method comprises incorporating a demulsifying-effective amount of a silicone-based demulsifier into the emulsion to separate the oil phase from the aqueous phase.

The emulsion can be, for example, a water-in-oil or oil-in-water emulsion. The emulsions particularly considered herein are those wherein the emulsified component is in the form of droplets with droplet sizes in the range of about 0.1 microns up to about 200 microns, more typically about 1-100 microns. The emulsified component can be unstabilized, but is more typically stabilized by a stabilizing amount of a surfactant.

The aqueous phase can be either an emulsified water phase in a continuous oil phase (i.e., in a water-in-oil emulsion) or a continuous water phase containing an emulsified oil phase. In either case, the aqueous phase can be essentially pure water, or alternatively, water with varying amounts of salt or other chemicals.

The oil phase can be either an emulsified oil phase in a continuous aqueous phase (i.e., an oil-in-water emulsion) or a continuous oil phase containing an emulsified water phase. In either case, the oil phase is any hydrophobic phase substantially insoluble with the aqueous phase. For example, the oil phase can be composed of one or more hydrophobic chemicals, typically liquids, which individually or in combination are mainly insoluble with the aqueous phase. Such hydrophobic chemicals can be, for example, linear or branched cyclic or acyclic, saturated or unsaturated, aliphatic or aromatic hydrocarbons. The hydrocarbons typically contain at least six carbon atoms and can be unsubstituted, or alternatively, substituted with one or more heteroatoms (e.g., hydroxyl, amino, carboxyl, amide, anhydride, ester, or ether groups) as long as the hydrocarbons remain mainly insoluble with the aqueous phase.

Some examples of oil phases include halogenated or non-halogenated $C_2$-$C_{30}$ hydrocarbons, and more particularly, halogenated or non-halogenated ethenes, butadienes, pentanes, hexanes, heptanes, octanes, benzenes, toluene, ethylbenzenes, xylenes, naphthalene, cresols, naphtha, fats, lubrication oils, petroleum, gasoline, crude oil, fuel oils, jet fuels, heating oils, cleaning oils, vegetable oils, mineral oils, and tar or bitumen derivatives.

The silicone demulsifier has a molecular structure comprising a polysiloxane backbone of at least two siloxane units covalently bound to (i) one or more alkylene oxide groups, and (ii) one or more oxirane-containing and/or oxetane-containing groups.

The polysiloxane backbone of the silicone demulsifier can be a linear, branched, or crosslinked polymeric framework of —Si—O— (siloxy) bonds, and can include any two or more of a combination of M, D, T, and Q groups, wherein, as known in the art, an M group represents a monofunctional group of formula $R_3SiO_{1/2}$, a D group represents a bifunctional group of formula $R_2SiO_{2/2}$, a T group represents a trifunctional group of formula $RSiO_{3/2}$, and a Q group represents a tetrafunctional group of formula $SiO_{4/2}$. Some examples of classes of polysiloxane backbone structures include the MM, MDM, TD, MT, MDT, MDTQ, MQ, MDQ, and MTQ classes of polysiloxanes, and combinations thereof.

The number of siloxane units in the polysiloxane backbone can be two (e.g., MM), but is typically at least three or greater. In one embodiment, the number of siloxane units is at least three and less than or equal to about 500. In another embodiment, the number of siloxane units is greater than 100. In yet another embodiment, the number of siloxane units is greater than 100 and less than or equal to 500. For example, for an $MD_nM$ type of polysiloxane backbone, n can be 0, 1, or a number up to about 500, or alternatively, a number of at least 98.

Typically, the R groups in the polysiloxane backbone are independently selected from hydrogen (H), halogen, and linear or branched, cyclic or acyclic, saturated or unsaturated hydrocarbon groups containing one to twenty carbon atoms and optionally heteroatom-substituted with one or more oxygen and/or nitrogen atoms. Some examples of suitable hydrocarbon groups for R include methyl, ethyl, n-propyl, isopropyl, n-butyl, isobutyl, sec-butyl, t-butyl, n-pentyl, isopentyl, neopentyl, n-hexyl, n-octyl, isooctyl, n-hexenyl, vinyl, allyl, butenyl, butadienyl, cyclopropyl, cyclobutyl, cyclopentyl, cyclohexyl, cyclohexenyl, phenyl, alkylated phenyl groups, methoxy, ethoxy, isopropoxy, n-butyloxy, t-butyloxy, isobutyloxy, n-pentoxy, neopentoxy, n-hexoxy, n-heptoxy, n-octoxy, phenoxy, vinyloxy, allyloxy, 2-methoxyethoxy, 2-ethoxyethoxy, 2-aminoethoxy, methylamino, dimethylamino, benzylamino, ethanolamino, and diethanolamino groups.

The R groups are more typically hydrocarbon groups or alkoxy groups containing one to six carbon atoms, and even more typically methyl, ethyl, methoxy, or ethoxy groups. One or more R groups of the polysiloxane backbone are necessarily replaced or substituted by one or more alkylene oxide groups and one or more oxirane-containing and/or oxetane-containing groups, in accordance with the molecular structure of the silicone demulsifier described above.

The one or more alkylene oxide groups covalently bound to the polysiloxane backbone comprise one or more alkylene oxide units. More typically, each alkylene oxide group comprises at least 10 and up to about 100 alkylene oxide units. Each alkylene oxide unit independently contains one to five carbon atoms. Some examples of alkylene oxide units include methyleneoxy(—$OCH_2$—), ethyleneoxy(—$OCH_2CH_2$—), propyleneoxy(—$OCH(CH_3)CH_2$—), trimethyleneoxy(—$OCH_2CH_2CH_2$—), butyleneoxy(e.g., —$OCH_2CH_2CH_2CH_2$—, —$OCH(CH_3)CH_2CH_2$— or —$OCH(CH_3)CH(CH_3)$—), and pentamethyleneoxy(—$OCH_2CH_2CH_2CH_2CH_2$—) units.

In one embodiment, the alkylene oxide group contains only one type of alkylene oxide unit. For example, the alkylene oxide group can be a polymethylene oxide, polyethylene oxide, polypropylene oxide, or polybutylene oxide.

In another embodiment, the alkylene oxide group contains at least two different types of alkylene oxide units. For example, the alkylene oxide group can be a copolymer having two, three, or four different types of alkylene oxide units selected from methylene oxide (MO), ethylene oxide (EO), propylene oxide (PO), and butylene oxide (BO) units. The copolymers can be block, random, or graft copolymers. Some examples of block copolymers include EO-MO, EO-PO, EO-BO, MO-BO, EO-MO-EO, EO-PO-EO, PO-EO-PO and EO-PO-BO types of polymers wherein each MO, EO, PO, and BO in the foregoing examples represents a block of one or more of the indicated alkylene oxide units.

In one embodiment, the alkylene oxide group is bound to the polysiloxane backbone directly, i.e., through a silicon-oxygen bond. In another embodiment, the alkylene oxide group is bound to the polysiloxane backbone indirectly through a linker X, which links a silicon atom of the polysiloxane backbone to the alkylene oxide group.

The linking group X is typically an alkylene group (—$CH_2$—)$_v$ where v is 1 or a higher integer. More typically, X is an alkylene linking group wherein v is 1 to 6, e.g., methylene (—$CH_2$—), dimethylene (—$CH_2CH_2$—), or trimethylene (—$CH_2CH_2CH_2$—). The linker X can also be branched as in —$C(CH_3)_2$—, —$CH_2CH(CH_3)CH_2$—, or —$CH_2C(CH_3)_2CH_2$—. The linker X can also be etherified, as in $[(-CH_2-)_u-O-(-CH_2-)_v]_w$, wherein u and v are independently 0, 1 or a higher integer, and w is 1 or a higher integer.

In a particular embodiment, the one or more alkylene oxide groups are independently according to the formula —$X_z$—$(OCHRCH_2)_sOR^7$ wherein X is an optional linking group, as described above, where z is 0 when X is not present or 1 when X is present; R is independently selected for each alkylene oxide unit from hydrogen or any of the hydrocarbon groups, as described above, having one to three carbon atoms; and $R^7$ is independently selected from hydrogen or a hydrocarbon group having one to twenty carbon atoms, as described above. The subscript s is 1 or a higher integer, and more typically, 10 or a higher integer, and even more typically, at least 10 and up to about 100.

In one specific embodiment, the one or more alkylene oxide groups are independently according to the formula —$X_z$—$(OCHRCH_2)_sOR^7$ wherein X, z, s, and $R^7$ are as described above and R is independently selected for each alkylene oxide unit from either hydrogen or methyl. In another specific embodiment, an alkylene oxide group has s as at least two and R as hydrogen for at least one alkylene oxide unit and methyl for at least one other alkylene oxide unit, thus corresponding to an ethylene oxide-propylene oxide (EO-PO) block or random copolymer.

In a more specific embodiment, the alkylene oxide group is an ethylene oxide-propylene oxide (EO-PO) block copolymer, represented by, for example, the formula —$X_z$—$(OCH_2CH_2)_s(OCH(CH_3)CH_2)_tOR^7$ or —$X_z$—$(OCH(CH_3)CH_2)_t(OCH_2CH_2)_sOR^7$, wherein X, z, and $R^7$ have been defined above. The subscripts s and t in the foregoing formulas are each independently 1 or a higher integer, and more typically, 5 or a higher integer, and even more typically, at least 5 and up to about 50.

The one or more oxirane- or oxetane-containing groups covalently bound to the polysiloxane backbone each contain one or more oxirane (i.e., epoxide) rings or one or more oxetane rings, respectively. The oxirane or oxetane ring can be covalently bound directly to one or more silicon atoms of the polysiloxane backbone, e.g., as an oxiranyl (—CH(O)$CH_2$) or oxetanyl (e.g., —$CH(CH_2)_2O$) group, or alternatively, indirectly through a linker, such as X, as described above. Some examples of oxirane-containing groups having a linking group include (—$CH_2$)$_v$CH(O)$CH_2$ where v is 1 or a higher integer, e.g., glycidyl (—$CH_2CH(O)CH_2$); ether-linked epoxides (e.g., according to the formula $[(-CH_2-)_u-O-(-CH_2-)_v]_w$—CH(O)$CH_2$ wherein u and v are independently 0, 1 or a higher integer, and w is 1 or a higher integer; phenylene epoxides (e.g., —$C_6H_4$—CH(O)$CH_2$) or —$C_6H_4$—$CH_2CH(O)CH_2$), cyclohexene oxides, diglycidyls such as —$CH_2(CH(O)CH_2)_2$, and the like.

The oxirane- and/or oxetane-containing group can also be bound to one or more of the alkylene oxide groups covalently bound to the polysiloxane backbone. In such an embodiment, the alkylene oxide group functions as a linking group (X) between the oxirane- or oxetane-containing group and the polysiloxane backbone.

One or more of the oxirane- or oxetane-containing groups can be ring-opened with a chemical or group capable of ring-opening an oxirane or oxetane ring, respectively, with or without the use of a catalyst. Some suitable ring-opening chemical groups include suitably nucleophilic and acidic species. Some examples of suitable nucleophilic chemicals include water, hydroxide salts, alcohols, alkoxides, thiols, thioalkoxides, amines, amides, phosphines, and metallated hydrocarbon reagents (e.g., Grignard reagents and n-butyllithium). The alcohol can be, for example, methanol, ethanol, n-propanol, isopropanol, n-butanol, isobutanol, t-butanol, a diol, or a polyalkylene glycol; and the alkoxide a deprotonated form of any of the foregoing alcohols. The amine can be, for example, a primary, secondary or tertiary amine (e.g., methylamine dimethylamine, trimethylamine, ethylamine, diisopropylmethylamine, ethylene diamine, or tetramethylethylene diamine), or a primary or secondary alcoholamine (e.g., ethanolamine, diethanolamine, triethanolamine, methylethanolamine ($CH_3NH$—$CH_2CH_2OH$), and methyldiethanolamine). Some examples of suitable acidic chemicals include the haloacids (e.g., hydrochloric and hydrobromic acids), sulfuric acid, nitric acid, and carboxylic acids. In a preferred embodiment, the oxetane ring is not ring-opened with water.

In one embodiment, the silicone demulsifier has a molecular structure comprising a polysiloxane backbone of at least two siloxane units covalently bound to (i) one or more of the alkylene oxide groups described above, and (ii) one or more oxirane-containing groups having oxirane rings not ring-opened before contacting the emulsion.

In another embodiment, the silicone demulsifier has a molecular structure comprising a polysiloxane backbone of at least two siloxane units covalently bound to (i) one or more of the alkylene oxide groups described above, and (ii) one or more oxirane-containing groups ring-opened by reaction with a chemical or group capable of opening an oxirane ring.

In still another embodiment, the silicone demulsifier has a molecular structure comprising a polysiloxane backbone of at least two siloxane units covalently bound to (i) one or more of the alkylene oxide groups described above, and (ii) one or more oxetane-containing groups having oxetane rings not ring-opened before contacting the emulsion.

In yet another embodiment, the silicone demulsifier has a molecular structure comprising a polysiloxane backbone of at least two siloxane units covalently bound to (i) one or more of the alkylene oxide groups described above, and (ii) one or more oxetane-containing groups ring-opened by reaction with a chemical or group capable of opening an oxetane ring.

In a specific embodiment, the silicone demulsifier is according to the formula:

$$M^1_a M^2_b M^3_c D^1_d D^2_e D^3_f T^1_g T^2_h T^3_i Q_j \quad (1)$$

wherein:
$M^1 = R^1_3 SiO_{1/2}$;
$M^2 = R^1_k R^2_{(3-k)} SiO_{1/2}$; k=0, 1 or 2
$M^3 = R^1_l R^3_{(3-l)} SiO_{1/2}$; l=0, 1 or 2
$D^1 = R^1_2 SiO_{2/2}$;
$D^2 = R^1_m R^2_{(2-m)} SiO_{2/2}$; m=0 or 1
$D^3 = R^1_n R^3_{(2-n)} SiO_{2/2}$; n=0 or 1
$T^1 = R^1 SiO_{3/2}$;
$T^2 = R^2 SiO_{3/2}$;
$T^3 = R^3 SiO_{3/2}$;
$Q = SiO_{4/2}$ In formula (1), $R^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms, as described above for R; $R^2$ is according to the formula —$(CH_2)_p(OR^4)_q(OR^5)_rOR^6$ where p is a number of 0 to 5, and q and r are each independently a number of 0 to 100, provided that the sum of q and r is at least 1; $R^3$ is a linear or branched, cyclic or acyclic, saturated or unsaturated hydrocarbon group having one to twenty carbon atoms and one or more oxirane-containing and/or oxetane-containing groups, wherein the oxirane or oxetane is optionally ring-opened by reaction with a suitable chemical or group capable of ring-opening an oxirane or oxetane ring, respectively, except that an oxetane ring is not ring-opened with water; each of $R^4$ and $R^5$ independently represents a divalent hydrocarbon radical having one to five carbon atoms; $R^6$ is hydrogen or a linear or branched, cyclic or acyclic, saturated or unsaturated hydrocarbon group having one to twenty carbon atoms; a, b, c, d, e, f, g, h, i and j are each independently 0 or a positive integer, provided that (a+b+c) equals (2+g+h+i 2j), the sum (a+b+c+d+e+f+g+h+i+j) is equal to or greater than 3, the sum (g+h+i+j) is equal to or greater than 0 and less than or equal to 10, and the sums (b+e+h) and (c+f+i) are independently a number of 1 to 200.

More typically, $M^1$ is $(CH_3)_3SiO_{1/2}$, $D^1$ is $(CH_3)_2SiO_{2/2}$, $D^2$ is $(CH_3)(R^2)SiO_{2/2}$, and $D^3$ is $(CH_3)(R^3)SiO_{2/2}$.

In one embodiment, the sum (a+b+c+d+e+f+g+h+i+j) is equal to or greater than 3 and less than or equal to about 500. In another embodiment, the sum (a+b+c+d+e+f+g+h+i+j) is greater than 100. In yet another embodiment, the sum (a+b+c+d+e+f+g+h+i+j) is greater than 100 and less than or equal to about 500.

In another embodiment, q and r in $R^2$ are each independently a number of 1 to 100, so that $R^2$ represents an ethylene oxide-propylene oxide (EO-PO) copolymer.

In a more specific embodiment, the silicone demulsifier is according to the formula:

$$M^1 D^1_d D^2_e D^3_f M^1 \quad (2)$$

wherein $M^1$, $D^1$, $D^2$, and $D^3$ are as defined above; d is 0 or a higher number, and e and f are independently 1 or a higher number. In a specific embodiment, the sum of d, e, and f is no greater than about 500.

The silicone demulsifier described above is incorporated into the emulsion in a demulsifying-effective amount. A demulsifying-effective amount is an amount that causes the at least partial demulsification, i.e., at least partial separation, of the oil and water phases of the emulsion. In particular embodiments, the demulsifying-effective amount is, for example, a concentration in the range of about 0.1-10,000 ppm, or about 0.5-1,000 ppm, or about 10-500 ppm.

The silicone demulsifier described above can optionally be accompanied by one or more of any of the well-known organic demulsifiers commonly used in the art. Some classes of such commonly used organic demulsifiers include hydrocarbon group-containing sulfonic acids (e.g., dodecylbenzene sulfonic acid), carboxylic acids (e.g., fatty acids), thiocarboxylic acids (e.g., sodium dioctylsulfosuccinate, DOSS), carboxylic acid esters (e.g., fatty acid esters, adipate esters, fumarate esters, and their triol counterparts) phosphinic acids, sulfates (e.g., lauryl sulfate), and phosphates; alkyleneoxide polymers or copolymers and their esters (e.g., the ethylene oxide-propylene oxide copolymers and/or their combination with formaldehyde resins or di- or polyamines); alkyleneoxide-functionalized phenolic resins (e.g., methylene linked butyl-, octyl-, or nonyl-phenols having EO-PO copolymer functionalization of phenolic groups, see, for example, U.S. Pat. Nos. 2,499,368, 2,499,370, 2,524,889, and 2,560,333); epoxy resins (e.g., those derived from reaction of diglycidyl bis-phenol A with an alkylene glycol); amine alkyleneoxides (i.e., alkylene oxide-derivatized amines, e.g., oxyalkylated fatty amide and fatty amine derivatives disclosed in U.S. Pat. No. 5,421,993 or U.S. Publication No. 2005/0080221 (Serial No. 684250)); polyimine alkoxylates (see, for example, U.S. Pat. Nos. 3,907,701 and 4,387,028); polyester amines (e.g., EO, PO, and EO/PO copolymers condensed with oxyalkylated fatty amine and a dicarboxylic acid); cationic surfactants (e.g., based on quaternary amines or quaternary ethoxylated amines; see, for example, U.S. Pat. Nos. 3,974,220 and 4,451,671); bis-amides (see, for example, those disclosed in U.S. Pat. No. 4,536,339); and silicone-based polymers or copolymers lacking a combination of one or more alkylene oxide groups and one or more oxirane-containing and/or oxetane-containing groups (e.g., silicone polyethers as disclosed in U.S. Pat. No. 4,596,653 and alkyl-silicone polyether terpolymers as disclosed in U.S. Pat. No. 5,004,559); and salts thereof.

When the organic demulsifier is included, the weight ratio of the silicone demulsifier of the invention to the organic demulsifier is typically in the range of about 100:1 to about 1:100, more typically in the range of about 100:1 to about 1:20.

The incorporation of the demulsifier can be achieved by any method known in the art for integrally mixing the demulsifier with the emulsion. The mixing procedure can use, for example, standard mixers, high-speed mixers or blenders, or shakers. The temperature can be unadjusted within room temperature limits (~20-30° C.), or adjusted as required, for example, to 40-150° C. for a suitable amount of time.

In another aspect, the invention is directed to a composition comprising the demulsifying-effective amount of silicone demulsifier, described above, and the components of the emulsion into which the silicone demulsifier was incorporated. For example, the composition can include the silicone demulsifier, an aqueous phase, and an oil phase.

In a specific embodiment, a solid filler (e.g., drilling mud and the like) is substantially excluded from the composition or from use in the method described above for breaking emulsions. By "solid filler" is meant solid materials in the form of particles, which is intentionally added to an emulsion or at least one of the liquid phases of the emulsion in order to fill a gap or modify the properties of the emulsion. By "substantially excluded" is meant that such solids can be present, at most, in residual or trace amounts. Such residual or trace amounts can correspond to the amounts typically encountered after substantial removal of solids by, for example, filtration. Such residual or trace amounts remain undesirable and provide no function to the composition. More preferably, the composition is nearly or completely absent of a solid filler.

Examples have been set forth below for the purpose of illustration. The scope of the invention is not to be in any way limited by the examples set forth herein.

EXAMPLE I

Preparation of $(CH_3)_3SiO(Si(CH_3)_2O)_{85}(Si(R^2)(CH_3)O)_{4.5}(Si(R^3)(CH_3)O)_3Si(CH_3)$ In the above formula, $R^2$ is a mixture of two polyether copolymers having the average formulas $—CH_2CH_2CH_2(OCH_2CH_2)_{13}(OCH(CH_3)CH_2)_{16}OH$ and $—CH_2CH_2CH_2—(OCH_2CH_2)_{33}(OCH(CH_3)CH_2)_{42}OH$ such that the combined average molecular weight is approximately 2200 g/mol, and $R^3$ is an epoxide-containing group of the formula $—(CH_2)_3CH(O)CH_2$.

The following materials were blended in a 5 L multi-neck flask: 965.76 g of a polydimethylmethylhydrogensiloxane with the general formula $(CH_3)_3Si(OSi(CH_3)_2)_{85}(OSi(H)(CH_3))_{7.5}OSi(CH_3)_3$, 1002.4 g of a polyether with the average formula of $CH_2=CHCH_2(OCH_2CH_2)_{13}(OCH(CH_3)CH_2)_{16}OH$, 980.89 g of a polyether with the average formula of $CH_2=CHCH_2(OCH_2CH_2)_{33}(OCH(CH_3)CH_2)_{42}OH$, and 857.00 g of isopropanol. The 5 L flask was equipped with an overhead stirrer, condenser and an addition funnel for the allyl glycidyl ether. The mixture was heated to 75° C. under a nitrogen blanket utilizing a heating mantle equipped with a digital temperature controller (Apollo, J-Kem Scientific, Saint Louis, Mo.). The opaque mixture was stirred at 500 rpm with a Teflon stir blade. When the temperature of the blend stabilized at 75° C., 2.0 ml of chloroplatinic acid (1 wt % in ethanol) was added. The temperature of the reaction increased to a final value of 86.9° C. after 15 minutes. Following the exotherm and the corresponding decrease in temperature (75.5° C.) 50.92 g of allyl glycidyl ether was added dropwise over a 25 min period. The allyl glycidyl ether was added slowly to not allow the temperature of the reaction to exceed 90° C. The temperature of the reaction was raised via the controller to 80° C. and the mixture was allowed to react for an additional 90 minutes, over which the mixture became clear with a straw color. The formulation was periodically tested for Si—H content using an infrared spectrometer model Nicolet 380 equiped with the diamond Smart Orbit accessory (ThermoElectron, Madison, Wis.). The peak at 910 cm$^{-1}$ commonly associated with the Si—H moiety diminished and the reaction was considered done. A small aliquot was removed and placed into a digestion tube containing a basic solution via a syringe. The digestion tube was examined for the formation of hydrogen gas. The lack of hydrogen bubbles confirmed the reaction was complete. Half the contents of the flask (1400 g) were placed in the rotary evaporator (BÜCHI Labortechnik AG, Switzerland) and stripped for 2 hours at 120° C. and 2 torr. The remaining half of the formulation was stripped under the same conditions. A straw-colored clear viscous liquid was obtained in near quantitative yields. The final viscosity of the silicone polyether was 3,300 cps.

EXAMPLE II

Preparation of $(CH_3)_3SiO(Si(CH_3)_2O)_{85}(Si(R^2)(CH_3)O)_{5.5}(Si(R^3)(CH_3)O)_{2.2}Si(CH_3)_3$ In the above formula, $R^2$ is a polyether with the general structure $—CH_2CH_2CH_2—(OCH_2CH_2)_{24}(OCH(CH_3)CH_2)_{27}OCH_3$, and $R^3$ is 4-ethylcyclohexene oxide as derived by hydrosilylation reaction on 4-vinyl-1,2-cyclohexene oxide.

The following materials were blended in a 5 L multi-neck flask: 571.41 g of a polydimethylmethylhydrogensiloxane with the general formula $(CH_3)_3Si(OSi(CH_3)_2)_{85}(OSi(H)(CH_3))_{7.7}OSi(CH_3)_3$, 2393.73 g of a polyether with the average formula of $CH_2=CHCH_2(OCH_2CH_2)_{24}(OCH(CH_3)CH_2)_{27}OCH_3$, and 857.14 g of isopropanol. The 5 L flask was equipped with an overhead stirrer, condenser and an addition funnel for the allyl 4-vinyl-1,2-cyclohexene oxide. The mixture was heated to 75° C. under a nitrogen blanket utilizing a heating mantle equipped with a digital temperature controller (Apollo, J-Kem Scientific, Saint Louis, Mo.). The opaque mixture was stirred at 500 rpm with a Teflon stir blade. When the temperature of the blend stabilized at 75° C., 2.0 ml of chloroplatinic acid (1 wt % in ethanol) was added. The temperature of the reaction increased to a final value of 82.0° C. after 10 minutes. Following the exotherm and the corresponding decrease in temperature (75.5° C.) 34.86 g of 4-vinyl-1-cyclohexeneoxide was added dropwise over a 10 min period. The 4-vinyl-1,2-cyclohexene oxide was added slowly to not allow the temperature of the reaction to exceed 90° C. The temperature of the reaction was raised via the controller to 80° C. and the mixture was allowed to react for an additional 90 minutes, over which the mixture became clear with a straw color. The formulation was periodically tested for Si—H content using an infrared spectrometer model Nicolet 380 equiped with the diamond Smart Orbit accessory (Thermo-Electron, Madison, Wis.). The peak at 910 cm$^{-1}$ commonly associated with the Si—H moiety diminished and the reaction was considered done. A small aliquot was removed and placed into a digestion tube containing a basic solution via a syringe. The digestion tube was examined for the formation of hydrogen gas. The lack of hydrogen bubbles confirmed the reaction was complete. Half the contents of the flask (1400 g) were placed in the rotary evaporator (BÜCHI Labortechnik AG, Switzerland) and stripped for 2 hours at 120° C. and 2 torr. The remaining half of the formulation was stripped under the same conditions. A straw-colored clear viscous liquid was obtained in near quantitative yields. The final viscosity of the silicone polyether was 4000 cps.

EXAMPLE III

Preparation of $(CH_3)_3SiO(Si(CH_3)_2O)_{300}(Si(R^2)(CH_3)O)_6(Si(R^3)(CH_3)O)_4Si(CH_3)$ In the above formula, $R^2$ is a mixture of two polyether copolymers having the average formulas —$CH_2CH_2CH_2(OCH_2CH_2)_{13}(OCH(CH_3)CH_2)_{16}OH$ and —$CH_2CH_2CH_2$—$(OCH_2CH_2)_{33}(OCH(CH_3)CH_2)_{42}OH$ such that the combined average molecular weight is approximately 2200 g/mol; and $R^3$ is an epoxide-containing group of the formula —$(CH_2)_3CH(O)CH_2$.

The following materials were blended in a 5 L multi-neck flask: 1086.53 g of a polydimethylmethylhydrogensiloxane with the general formula $(CH_3)_3Si(OSi(CH_3)_2)_{300}(OSi(H)(CH_3))_{10}OSi(CH_3)_3$, 450.15 g of a polyether with the general formula of $CH_2$=$CHCH_2(OCH_2CH_2)_{13}(OCH(CH_3)CH_2)_{16}OH$, 440.48 g of a polyether with the average formula of $CH_2$=$CHCH_2(OCH_2CH_2)_{33}(OCH(CH_3)CH_2)_{42}OH$, 22.90 g of allyl glycidyl ether and 857.14 g of isopropanol. The 5 L flask was equipped with a condenser and an overhead stirrer. A nitrogen blanket was applied and the mixture was heated to 75° C. using heating mantel equipped with a digital temperature controller (Apollo, J-Kem Scientific, Saint Louis, Mo.). The opaque mixture was stirred at 500 rpm with a Teflon stir blade. When the temperature of the blend stabilized at 75° C., 2.5 ml of chloroplatinic acid (1 wt % in ethanol) was added. The temperature of the reaction began to increase to a final value of 86.6° C. after 10 minutes. Following the exotherm and the reaction temperature fell to 75° C., the temperature controller was reset to 80° C. and allowed to react for an additional 35 minutes. Upon the additional reaction time the mixture became clear. The formulation was periodically tested for Si—H content using an infrared spectrometer model Nicolet 380 equipped with the diamond Smart Orbit accessory (ThermoElectron, Madison, Wis.). The peak at 910 cm$^{-1}$ commonly associated with the Si—H moiety diminished and the reaction was considered complete. A small aliquot was removed and placed into a digestion tube containing a basic solution via a syringe. The digestion tube was examined for hydrogen bubbles. The lack of hydrogen bubbles confirmed the reaction was complete. Half the contents of the flask (1400 g) were placed in the rotary evaporator (BÜCHI Labortechnik AG, Switzerland) and stripped for 2 hours at 120° C. and 2 torr. The remaining half of the formulation was stripped under the same conditions. A straw-colored opaque viscous liquid was obtained in near quantitative yields. The final viscosity of the silicone polyether was 200,000 cps.

EXAMPLE IV

Preparation of $(CH_3)_3SiO(Si(CH_3)_2O)_{300}(Si(R^2)(CH_3)O)_{15}(Si(R^3)(CH_3)O)_{10}Si(CH_3)$ In the above formula, $R^2$ is a mixture of two polyether copolymers having the average formulas —$CH_2CH_2CH_2(OCH_2CH_2)_{13}(OCH(CH_3)CH_2)_{16}OH$ and —$CH_2CH_2CH_2$—$(OCH_2CH_2)_{33}(OCH(CH_3)CH_2)_{42}OH$ such that the combined average molecular weight is approximately 2200 g/mol; and $R^3$ is an epoxide-containing group of the formula —$(CH_2)_3CH(O)CH_2$.

The following materials were blended in a 5 L multi-neck flask: 661.68 g of a polydimethylmethylhydrogensiloxane with the general formula $(CH_3)_3Si(OSi(CH_3)_2)_{300}(OSi(H)(CH_3))_{25}OSi(CH_3)_3$, 659.49 g of a polyether with the average formula of $CH_2$=$CHCH_2(OCH_2CH_2)_{13}(OCH(CH_3)CH_2)_{16}OH$, 645.33 g of a polyether with the average formula of $CH_2$=$CHCH_2(OCH_2CH_2)_{33}(OCH(CH_3)CH_2)_{42}OH$, and 857.14 g of isopropanol. The 5 L flask was equipped with an overhead stirrer, condenser and an addition funnel for the allyl glycidyl ether. The mixture was heated to 75° C. under a nitrogen blanket utilizing a heating mantle equipped with a digital temperature controller (Apollo, J-Kem Scientific, Saint Louis, Mo.). The opaque mixture was stirred at 500 rpm with a Teflon stir blade. When the temperature of the blend stabilized at 75° C., 2.0 ml of chloroplatinic acid (1 w % in ethanol) was added. The temperature of the reaction increased to a final value of 81.7° C. after 15 minutes. Following the exotherm and the corresponding decrease in temperature (77.5° C.) 33.51 g of allyl glycidyl ether was added dropwise over a 20 min period. The allyl glycidyl ether was added slowly to not allow the temperature of the reaction to exceed 90° C. The temperature of the reaction was raised via the controller to 80° C. and the mixture was allowed to react for an additional 90 minutes, over which the mixture became clear with a straw color. The formulation was periodically tested for Si—H content using an infrared spectrometer model Nicolet 380 equiped with the diamond Smart Orbit accessory (ThermoElectron, Madison, Wis.). The peak at 910 cm$^{-1}$ commonly associated with the Si—H moiety diminished and the reaction was considered done. A small aliquot was removed and placed into a digestion tube containing a basic solution via a syringe. The digestion tube was examined for the formation of hydrogen gas. The lack of hydrogen bubbles confirmed the reaction was complete. Half the contents of the flask (1400 g) were placed in the rotary evaporator (BÜCHI Labortechnik AG, Switzerland) and stripped for 2 hours at 120° C. and 2 torr. The remaining half of the formulation was stripped under the same conditions. A straw-colored clear viscous liquid was obtained in near quantitative yields. The final viscosity of the silicone polyether was 40,000 cps.

EXAMPLE V

Preparation of $(CH_3)_3SiO(Si(CH_3)_2O)_{300}(Si(R^2)(CH_3)O)_{30}(Si(R^3)(CH_3)O)_{20}Si(CH_3)$ In the above formula, $R^2$ is a mixture of two polyether copolymers having the average formulas —$CH_2CH_2CH_2$ $(OCH_2CH_2)_{13}(OCH(CH_3)CH_2)_{16}OH$ and $-CH_2CH_2CH_2-(OCH_2CH_2)_{33}(OCH(CH_3)CH_2)_{42}OH$ such that the combined average molecular weight is approximately 2200 g/mol; and $R^3$ is an epoxide-containing group of the formula $-(CH_2)_3CH(O)CH_2$.

The following materials were blended in a 5 L multi-neck flask: 416.15 g of a polydimethylmethylhydrogensiloxane with the general formula $(CH_3)_3Si(OSi(CH_3)_2)_{300}(OSi(H)(CH_3))_{50}OSi(CH_3)_3$, 783.23 g of a polyether with the average formula of $CH_2=CHCH_2(OCH_2CH_2)_{13}(OCH(CH_3)CH_2)_{16}OH$ 763.74 g of a polyether with the average formula of $CH_2=CHCH_2(OCH_2CH_2)_{33}(OCH(CH_3)CH_2)_{42}OH$, and 857.15 g of isopropanol. The 5 L flask was equipped with an overhead stirrer, condenser and an addition funnel for the allyl glycidyl ether. The mixture was heated to 75° C. under a nitrogen blanket utilizing a heating mantle equipped with a digital temperature controller (Apollo, J-Kem Scientific, Saint Louis, Mo.). The opaque mixture was stirred using an overhead stirrer at 500 rpm with a Teflon stir blade. When the blend stabilized at 75° C., 2.0 ml of chloroplatinic acid (1 wt % in ethanol) was added. The temperature of the reaction increased to a final value of 80.2° C. after 10 minutes. After the exotherm and the resulting decrease in temperature (77.9° C.) allyl glycidyl ether (39.65 g) was added dropwise over a 10 minute period. The reaction temperature was increased via the controller to 80° C. and the mixture was allowed to react an additional 90 minutes. During this additional reaction time the mixture became clear with a straw color. The formulation was periodically tested for Si—H content using an infrared spectrometer model Nicolet 380 equipped with the diamond Smart Orbit accessory (ThermoElectron, Madison, Wis.). The peak at 910 cm$^{-1}$ commonly associated with the Si—H moiety diminished and the reaction was considered done. A small aliquot was removed and placed into a digestion tube containing a basic solution via a syringe. The digestion tube was examined for the formation of hydrogen gas. The lack of hydrogen bubbles confirmed the reaction was complete. Half the contents of the flask (1400 g) were placed in the rotary evaporator (BÜCHI Labortechnik AG, Switzerland) and stripped for 2 hours at 120° C. and 2 torr. The remaining half of the formulation was stripped under the same conditions. A straw-colored clear viscous liquid was obtained in near quantitative yields. The final viscosity of the silicone polyether was 16,000 cps.

EXAMPLE VI

Preparation of Ring-Opened Epoxide Product of Example I

The product of Example I (1400 g) was combined with 30.90 g of diethanol amine (Sigma Aldrich, Wis.). The flask was equipped with a condenser, and overhead stirrer and a drying tube. The mixture was brought to reflux by using a heating mantle controlled with a Variac transformer and stirrer at 500 rpm with a Teflon blade. The reaction was allowed to proceed until all epoxy groups were consumed as determined by titration. The final product obtained was a straw-colored opaque liquid with a viscosity of about 3,700 cps.

EXAMPLE VII

Preparation of Ring-Opened Epoxide Product of Example III

The product of Example III (1400 g) was combined with 13.42 g of diethanol amine (Sigma Aldrich, Wis.). The flask was equipped with a condenser, and overhead stirrer and a drying tube. The mixture was brought to reflux by using a heating mantle controlled with a Variac transformer and stirrer at 500 rpm with a Teflon blade. The reaction was allowed to proceed until all epoxy groups were consumed as determined by titration. The final product obtained was a straw-colored opaque liquid with a viscosity of about 160,000 cps.

EXAMPLE VIII

Preparation of Ring-Opened Epoxide Product of Example IV

The product of Example IV (1400 g) was combined with 19.66 g of diethanol amine (Sigma Aldrich, Wis.). The flask was equipped with a condenser, and overhead stirrer and a drying tube. The mixture was brought to reflux by using a heating mantle controlled with a Variac transformer and stirrer at 500 rpm with a Teflon blade. The reaction was allowed to proceed until all epoxy groups were consumed as determined by titration. The final product obtained was a straw-colored opaque liquid with a viscosity of about 26,000 cps.

EXAMPLE IX

Alternative Preparation of Ring-Opened Epoxide Product of Example V

The product of Example V (1400 g) was combined with 23.27 g of diethanol amine (Sigma Aldrich, Wis.). The flask was equipped with a condenser, and overhead stirrer and a drying tube. The mixture was brought to reflux by using a heating mantle controlled with a Variac transformer and stirrer at 500 rpm with a Teflon blade. The reaction was allowed to proceed until all epoxy groups were consumed as determined by titration. The final product obtained was a straw-colored opaque liquid with a viscosity of about 15,000 cps.

EXAMPLE X

Combination of Product of Example I with an Organic Demulsifier

The silicone terpolymer in EXAMPLE I was blended with 10 wt. % dodecylbenzene sulfonic acid.

EXAMPLE XI

Combination of Product of Example I with an Organic Demulsifier

The silicone terpolymer in EXAMPLE I was blended with 10 wt. % dioctyl sulfosuccinate, which was first dissolved in naptha.

EXAMPLE XII

Combination of Product of Example VIII with an Organic Demulsifier

The silicone terpolymer in EXAMPLE VIII was blended with 10 wt. % dodecylbenzene sulfonic acid.

In Examples XIII-XVII, the phase separation efficiency of silicone terpolymer demulsifiers was tested and compared to other demulsifiers.

The composition of comparative silicone demulsifiers SD-1 to SD-10 is listed below:

SD-1: $Me_3Si[(OSiMe_2)70(OSiMeP)_{5.2}]OSiMe_3$ where P=77 mole % $-C_3H_6(OC_2H_4)_{13.6}(OC_3H_6)_{15.5}OMe$, and 23 mole % $-C_3H_6(OC_2H_4)_{36.4}(OC_3H_6)_{41.4}OMe$ SD-2: $Me_3Si[(OSiMe_2)_{74}(OSiMeP)_9]OSiMe_3$, where $P=C_3H_6(OC_2H_4)_{19}(OC_3H_6)_{21.6}OH$ SD-3: A blend of 50 wt. % $Me_3Si[(OSiMe_2)_{100}(OSiMeP)_{24}]OSiMe_3$, where P=50 mole % $C_3H_6(OC_2H_4)_{7.5}OH$ and 50 mole % 1,1,1-Trimethylolpropane monoallyl ether and 50 wt. % Voranol CP6001 (a polyether polyol product available from Dow Chemical Co., Midland, Mich.)

SD-4: A blend of 18.7 wt. % $Me_3Si[(OSiMe_2)_{74}(OSiMeP)_9]OSiMe_3$, where $P=C_3H_6(OC_2H_4)_{12}(OC_3H_6)_3OH$, 37.5 wt. % Voranol CP 6001 (a polyether polyol product available from Dow Chemical Co., Midland, Mich.), 25 wt. % Aromatic 150 Fluid (available from EXXON MOBIL Corp., Fairfax, Va.) and 18.8 wt. % Dipropylene glycol SD-5: A blend of 50 wt. % $Me_3Si[(OSiMe_2)_{70}(OSiMeP)_{5.2}]OSiMe_3$, where P=77 mole % $—C_3H_6(OC_2H_4)_{13.6}(OC_3H_6)_{15.5}OMe$, and 23 mole % $—C_3H_6(OC_2H_4)_{36.4}(OC_3H_6)_{41.4})OMe$. and 50 wt. % Voranol CP6001 (a polyether polyol product available from Dow Chemical Co., Midland, Mich.)

SD-6: A blend of 50 wt. % $Me_3Si[(OSiMe_2)_{74}(OSiMeP)_9]OSiMe_3$, where $P=C_3H_6(OC_2H_4)_{19}(OC_3H_6)_{21.6}OH$ and 50 wt. % Voranol EP-1900 (a polyether polyol product available from Dow Chemical Co., Midland, Mich.)

SD-7: A blend of 50 wt. % $Me_3Si[(OSiMe_2)_{74}(OSiMeP)_9]OSiMe_3$, where $P=C_3H_6(OC_2H_4)_{19}(OC_3H_6)_{21.6}OH$ and 50 wt. % Voranol CP6001 (a polyether polyol product available from Dow Chemical Co., Midland, Mich.)

SD-8: $Me_3Si[(OSiMe_2)_{65.5}(OSiMeP)_{7.2}]OSiMe_3$, where P=25.9 mole % $C_3H_6(OC_2H_4)_{7.5}OAc$, and 74.1 mole % $—C_3H_6(OC_2H_4)_{36}(OC_3H_6)_{40}OAc$ SD-9: A blend of 12.5 wt. % $Me_3Si[(OSiMe_2)_{72}(OSiMeP)_{18}]OSiMe_3$, where P=1,1,1-Trimethylolpropane monoallyl ether, 50 wt. % Voranol CP6001 (a polyether polyol product available from Dow Chemical Co., Midland, Mich.) and 37.5 wt. % 2-Ethylhexanol SD-10: $Me_3Si[(OSiMe_2)_{24.5}(OSiMeP)_{3.5}]OSiMe_3$, where $P=C_3H_6(OC_2H_4)_{7.5}OH$ SD-11: $Me_3Si[(OSiMe_2)_{74}(OSiMeP)_9]OSiMe_3$, where $P=C_3H_6(OC_2H_4)_{12}(OC_3H_6)_3OH$ SD-12: $Me_3Si[(OSiMe_2)_{43.2}(OSiMeP)_{6.8}(OSiMe_2)_{2.2}]OSiMe_3$, where $P=C_3H_6—(OC_2H_4)_{12}(OC_3H_6)_3—OH$ SD-13: $PMe_2Si[(OSiMe_2)_{10}]OSiMe_2P$, $P=C_3H_6(OC_2H_4)_{12}OH$ SD-14: $PMe_2Si[(OSiMe_2)_{10}]OSiMe_2P$, $P=C_3H_6(OC_2H_4)_{7.5}OH$ SD-15: $Me_3Si[(OSiMe_2)_{72}(OSiMeP)_{18}]OSiMe_3$, where P=40% mol Eugenol and 60% mol $C_3H_6(OC_2H_4)_{7.5}—OMe$

EXAMPLE XIII

Phase Separation Study

The phase separation of a sample of a heavy crude oil containing 43.8 wt. % emulsified water from a steam flooding operation in California, USA was studied. One hundred grams of crude oil emulsion was carefully poured into 125 ml, heavy wall glass jars. The jars were purchased from ACE Glass in Vineland, N.J. and they had a translucent, safety coating and they could be closed with threaded teflon closure containing FETFE O-ring sealing. The demulsifiers were diluted at 10 or 2.5 wt. % concentrations in a solvent, which contained 70 vol. % n-heptane and 30 vol. % toluene. First, the glass jars with the crude oil sample were heated to 90° C. in an oil bath. Then the jars were taken out of the oil bath and the required amount of diluted demulsifier was added to the crude oil emulsion and the jars were closed again paying particular care that no air leakage could occur. Then the crude oil and the demulsifier were mixed together with Barnstead/Labline Max 2000 orbital shaker for 10 min at 150 shakes/min rate. The glass jars with the samples were then placed back to the oil bath and heated at 130° C. for 4-5 hours. Then the jars were cooled to 90° C. again and the water content at the upper part of the oil phase was measured. A sample of 0.05-0.5 g was taken from 1 cm under the top of the oil phase and then its water content was measured with Karl-Fischer titration using a Brinkman Titrino Workcell with "751 GDP" titrator and Hydranal Composite-2 titrator solution. The samples were then heated further in the oil bath at either 90° C. or at 130° C. overnight (for about 16 hours). Samples from the top were then taken again and their water content was again measured using the same procedure as above. The samples, which were heated at 130° C., were first cooled to 90° C., prior to sampling.

Without demulsifier, the emulsion lost only a small amount of water and the water content of the oil phase was 32.8% after heating as described above, at 130° C.

Table 1 shows the water content in the top of oil phase after heating at 130° C. for 4-5 h and after the additional 16 h heating at 90° C., respectively, with various demulsifiers. Comparative demulsifier OD-1 was an organic demulsifier of diepoxide type.

TABLE 1

| Demulsifier | Demul. conc. ppm | H2O wt. % 130° C., 4-5 h | H₂O wt. % 90° C. + 16 h |
|---|---|---|---|
| OD-1 | 200 | 4.11 | 1.22 |
| OD-1 | 200 | 5.50 | 2.03 |
| OD-1 | 200 | 7.96 | 3.20 |
| OD-1 | 200 | 4.11 | 2.19 |
| Example IV | 200 | 1.44 | 0.33 |
| Example IV | 200 | 1.60 | 0.41 |
| Example IV | 200 | 1.30 | 0.30 |
| Example IV | 200 | 6.45 | 0.34 |
| Example IV | 100 | 4.22 | 0.37 |
| Example IV | 50 | | 0.43 |
| Example I | 200 | 11.80 | 0.47 |
| Example I | 200 | 6.22 | 0.53 |
| Example I | 200 | 5.54 | 0.59 |
| Example I | 200 | 3.69 | 0.42 |
| Example X | 200 | 4.88 | 0.71 |
| Example XII | 200 | 3.21 | 0.51 |
| Example XI | 200 | 1.53 | 0.26 |
| Example XI | 25 | | 9.01 |
| SD-1 | 200 | 1.36 | 0.91 |

Table 2 shows the water concentration in the oil after heating at 130° C. overnight. The tables demonstrate that the silicone terpolymers described in the present invention caused a better water removal than the reference organic demulsifier or the silicone polyethers.

TABLE 2

| Demulsifier | Demul. ppm | H2O wt. % 130° C., 16 h |
|---|---|---|
| OD-1 | 100 | 0.99 |
| OD-1 | 50 | 2.99 |
| Example IV | 50 | 0.58 |
| Example IV | 50 | 0.55 |
| Example I | 50 | 0.55 |
| Example XII | 50 | 0.46 |
| Example XII | 25 | 0.55 |
| Example VIII | 100 | 0.54 |
| Example II | 50 | 0.63 |
| SD-2 | 50 | 0.52 |
| None | 0 | 32.80 |

EXAMPLE XIV

Phase Separation Study

Oil sands in Canada contain mostly sand and bitumen. In a major technology the sand is mined and then in the first step of the separation it is blended with warm water, which contains alkali and air is also injected into it. This treatment separates a large amount of sand and water at the bottom and a layer of froth forms at the top, which contains bitumen, some air, sand and water, which is emulsified into the bitumen. The froth is skimmed from the top and it is a pasty asphalt-like material.

The efficiency of silicone demulsifiers in the present invention was studied with a Bitumen Froth sample made by Syncrude Research (Fort McMurray, Canada). The Bitumen froth sample contained bitumen, water and sand/clay. First, the froth sample was homogenized, so that its water content is well distributed. This sample was transferred into a ½ gallon plastic container and mixed with a 3" turbine mixer for about 6 hours, at 800 rpm (gradually increasing the speed). During this time the drop size of the emulsion may have been reduced, but probably not significantly. All the tests were performed at ambient temperature. The homogenized froth could be used for several days without further mixing. Then, a sample from the froth was mixed with naphtha in 1:1 weight ratio and shaken until it became homogeneous. The viscosity of the blend dropped substantially after the dilution and it was easily pourable. A diluted sample was tested only on the day of the dilution.

The separation could not be seen at the bottom and the separation was monitored by measuring the decrease of the water content in the middle of the sample.

Twenty grams of the blend was placed in a vial, the demulsifier was added and it was shaken for 30 sec in a wrist action shaker, at about 330 shakes/min rate. The demulsifiers were pre-diluted at 2.5 wt. % in naphtha.

The sample was then stored for one hour and about 0.5-1.5 g was taken from the middle, always at the same height (3.5 cm from the bottom; with a total height of 6.5 cm). The sample was then analyzed for water content using a Karl-Fischer Automat E 547 coulometric titrator (with Dosimat E535) using Hydranal Composite-2 titrator solution. A special solvent had to be used so that the bitumen does not precipitate out and it contained a Hydranal Solvent and xylene (50-50 vol. %) blend. The Hydranal solutions were purchased from Aldrich Chemical Co., Milwaukee, Wis.

As demulsifier, the silicone terpolymers in Examples I-IX, organic demulsifier OD-1 and comparative silicone demulsifiers SD-1 to SD-10 were tested.

Table 3 shows the water content of the separated emulsions.

TABLE 3

| Demulsifier | ppm | Water, % |
| --- | --- | --- |
| Control (no demulsifier) | 0 | 4.11 |
| SD-3 | 200 | 1.15 |
| SD-4 | 200 | 1.14 |
| SD-5 | 200 | 1.05 |
| Example IX | 200 | 1.03 |
| OD-1 | 200 | 0.94 |
| Example VII | 200 | 0.93 |
| Example III | 200 | 0.90 |
| SD-6 | 200 | 0.89 |
| SD-7 | 200 | 0.85 |
| SD-8 | 200 | 0.81 |
| SD-9 | 200 | 0.76 |

TABLE 3-continued

| Demulsifier | ppm | Water, % |
| --- | --- | --- |
| SD-10 | 200 | 0.71 |
| Example V | 200 | 0.69 |
| SD-2 | 200 | 0.68 |
| Example VI | 200 | 0.67 |
| Example VIII + CP-6001 | 100 + 100 | 0.64 |
| SD-1 | 200 | 0.62 |
| Example II | 200 | 0.55 |
| Example VIII | 200 | 0.47 |
| Example I | 200 | 0.41 |
| Example IV | 200 | 0.32 |

Table 3 illustrates that the terpolymers of the present invention provide an improved phase separation of water-in-oil emulsions.

EXAMPLE XV

Phase Separation Study

A bitumen froth sample made from Atabasca tar sand (from Exxon) was studied. The froth contained about 28 wt. % water, 16 wt. % sand, and 56 wt. % bitumen.

This froth sample was significantly more viscous than the one in EXAMPLE XIV and therefore it was mixed only by hand. As a result, a significant part of the water phase in the froth was separated and it was removed before testing. The bitumen froth was then processed and tested with the same method as in EXAMPLE XIV.

Table 4 shows the water content with various silicone terpolymers and comparative silicone demulsifiers. As a reference, OD-2, an organic demulsifier was used which is known in this technology.

TABLE 4

| Demulsifier | ppm | Water, % |
| --- | --- | --- |
| Control (no dem.) | 0 | 2.06 |
| SD-5 | 200 | 2.09% |
| EXAMPLE VI | 200 | 1.92 |
| SD-2 | 200 | 1.92% |
| OD-2 | 200 | 1.89 |
| EXAMPLE I | 200 | 1.65 |
| EXAMPLE IX | 200 | 1.23 |
| EXAMPLE XII | 200 + 20 | 0.98 |
| EXAMPLE IV | 200 | 0.94 |
| EXAMPLE IV | 200 | 0.83 |
| EXAMPLE V | 200 | 0.73 |
| EXAMPLE VIII | 200 | 0.68 |
| EXAMPLE VIII | 200 | 0.67 |
| EXAMPLE VIII | 100 | 1.48 |

Table 4 demonstrates that the silicone terpolymers of the present invention provide an improved phase separation efficiency.

EXAMPLE XVI

Phase Separation Study

Crude oil demulsifiers were tested in Libya with fresh, light crude oils from two different oil fields. The application called for fast separation, clean separated water, dry crude and the crude oil-water interface had to be as sharp as possible after separation. The competitive organic demulsifier, referred to as OD-3, was a blend of four, different organic demulsifiers (OD-4, OD-5, OD-6 and OD-7) in an aromatic solvent (probably 60% active matter and 40% solvent).

A mixture of crude oils from several (5-8) nearby wells were tested and prior to the demulsification tests the crude oil blends were thoroughly mixed.

First the water cut was determined by blending 50 part (vol.) of crude oil with 50 parts (vol.) of xylenes and with a highly efficient demulsifier in sufficient dose to completely separate the water from the crude. Then this blend was centrifuged at 4000 rpm for 6 min and the water cut was determined.

In the bottle tests 100 ml of crude oil was placed in centrifuge tubes, the various demulsifiers were added and the bottles were hand shaken 200 times and then the samples were kept in a water bath at 40° C. for 120 min. The amount of the separated water was determined at regular intervals. After 120 min the tubes were removed from the bath and the appearance of the separated crude oil, the separated water phase and crude oil/water interface, respectively, were rated as Ex (excellent or sharp and very soft interface), VG (very good or sharp and soft interface), G (good or medium soft interface) or P (Poor or hard interface). The residual water content in the separated crude oil for the best demulsifiers was determined in two steps. First 50 parts (vol.) of separated crude oil was blended with 50 parts (vol.) of xylenes in a centrifuge tube. Then this blend was vigorously shaken 200 times by hand and centrifuged at 4000 rpm for 6 min and the amount of separated water was recorded. In another centrifuge tube, again 50 parts (vol.) of separated crude oil was blended with 50 parts (vol.) of xylenes and two drops of a highly efficient demulsifier, followed by vigorous shaking. The two tubes were then centrifuged at 4000 rpm for 6 minutes, followed by the measurement of separated water as in the first step. The difference between the two water separations (called as "emulsion") characterized the efficiency of a demulsifier. If the "emulsion" number is zero this means that the demulsifier caused a complete phase separation or a dry oil.

Oil Field 1:

The crude oil produced had an API of 37 and a water cut of 54-56% vol.

All silicone materials were diluted to 10% actives and were dosed at 14 ppm. As the bottle tests contain 100 mL crude, the maximum water separated is 54-56 mL so an efficient demulsifier should reach a value close or equal to 54 or 56 after 120 minutes separation in the table below.

The test results are shown in Table 5. Among the silicones Example VI and SD-10 performed best. They were much better than formulation OD-3. Example II and SD-11 gave also better separation results than OD-3. Example VI gave the driest oil amongst the silicone based demulsifiers. Example VI gave also the quickest phase separation from all the demulsifiers tested with 36 ml in 5 minutes. Similar to the organics the silicones led to a very good or excellent (soft) interface and a clear separated water phase.

TABLE 5

| | ppm | 5' | 10' | 15' | 30' | 45' | 60' | 90' | 120' | Water | Interface | Oil | Emulsion |
|---|---|---|---|---|---|---|---|---|---|---|---|---|---|
| | | Volume in ml of water phase after separation time of | | | | | | | | Separation Quality | | | |
| Blank | 14 | 0 | 0 | 0 | 0 | 0 | 0 | 0 | 0 | — | — | P | — |
| OD-4 | 14 | 0.1 | 0.3 | 0.4 | 14 | 48 | 52 | 52 | 54 | VG | EX | EX | 0 |
| OD-5 | 14 | 3.5 | 5 | 6.5 | 18 | 37 | 51 | 52 | 52 | VG | G | VG | 0.1 |
| OD-6 | 14 | 0 | 4.5 | 5 | 39 | 52 | 55 | 56 | 56 | VG | VG | EX | 0 |
| OD-7 | 14 | 4 | 12 | 16 | 16 | 36 | 43 | 45 | 48 | EX | EX | G | 3 |
| SD-11 | 14 | 12 | 16 | 20 | 26 | 29 | 35 | 36 | 37 | VG | EX | P | 4 |
| Example VI | 14 | 36 | 40 | 42 | 44 | 50 | 53 | 53 | 53 | VG | VG | VG | 0.2 |
| SD-10 | 14 | 12 | 16 | 23 | 29 | 33 | 38 | 40 | 42 | VG | EX | P | 1.5 |
| Example II | 14 | 0 | 2 | 3 | 5 | 13 | 20 | 27 | 35 | EX | EX | P | 4.3 |
| OD-3 | 14 | 7 | 12 | 16 | 19 | 22 | 24 | 27 | 30 | VG | VG | VG | 2 |

Oil Field 2:

The second oil field also produced light crude (average API of 38) and had a water cut of 38% vol. The same organic demulsifier blend, OD-3 was used here as reference, and the demulsifiers were diluted with 73% aromatic solvent and dosed at 8 ppm.

The crude sample was collected a day before testing and allowed to settle down over night. Next day, the free water that separated out was removed. The best demulsifiers identified in Oil field 1 above were tested. The results are shown in Table 6.

TABLE 6

| | ppm | 5' | 10' | 15' | 30' | 60' | 90' | 120' | Water | Interface | Oil | Emulsion |
|---|---|---|---|---|---|---|---|---|---|---|---|---|
| | | | | | | | | | Separation Quality | | | |
| Blank | | 0 | 0 | 0 | 0 | 0 | 0 | 0 | N/A | N/A | N/A | — |
| OD-3 | 8 | 0 | 0.2 | 0.3 | 1 | 4 | 7.5 | 9 | EX | EX | VG | — |
| SD-10 | 4 | 0 | 0.4 | 0.5 | 3 | 5 | 7 | 9 | EX | G | G | 4 |
| Example VI | 4 | 0 | 1.4 | 2 | 5 | 10 | 12 | 18 | EX | VG | VG | 2 |
| SD-11 | 4 | 0.5 | 2.5 | 3 | 4 | 6 | 7 | 10 | EX | EX | G | — |

Example VI was the most efficient with this crude oil with a lower water cut than the crude oil from Oil Field 1. It was much more efficient than OD-3 and led to a good quality of separated water phase, a very good (soft) interface and a quite dry oil.

EXAMPLE XVII

Phase Separation Study

Diesel fuel obtained after refining of crude oil does not normally contain water, during transportation, however, it can be contaminated with water and above the saturation limit of about 100 ppm the diesel fuel can become hazy. Due to the new generation of injectors in diesel engines diesel fuel should not contain any water. If there is a small amount of water in the diesel fuel, it can corrode the valve of the injector and this can eventually lead to engine break-down.

To reduce the water content in the diesel fuel, a dehazing agent (demulsifier) is added to the fuel additive packages, which also contain lubricity aid, surfactant to clean the valves of the engine, cetane improver, antifoam etc.

ASTM method D1094-85 is used to test the dehazing properties of the package in a particular diesel fuel. In this test 20 ml of pH 7 phosphate buffer and 80 mL of a treated diesel fuel are mixed in a 100 mL graduated cylinder. Two cylinders, corresponding to the use of different demulsifiers in the packages are hand shaken for 2 minutes with 1-2 strokes per second and let for 5 minutes stand vertically. The amount of clear water is measured ant the quality of the emulsion interface and of the water and diesel fuel phases. A good demulsifier will lead to a 20 ml water phase and clear water and diesel fuel phases.

In order to eliminate the operator dependence of shaking the cylinders, we used a mechanical shaker. Four tubes were placed on a semi rigid foam perpendicular to the shaking direction.

Various demulsifiers were tested with a diesel fuel package AP3 (which contained no demulsifier), with three different fuels: Fuel A, Fuel B and Fuel Halterman. Diesel fuel Haltermann is an ASTM reference fuel and it was provided by Dow Chemical Company Co., Midland, Mich.

The amounts of clear water separated after 5 and 10 minutes, respectively, were measured. As references, untreated diesel fuel (no additive package added), and a package without antifoam or demulsifier (AP4) were both used. The silicone based demulsifiers/dehazers were tested by blending them into the diesel package, which contained no demulsifier (AP3).

TABLE 7

| | Volume of water in mL, at 25° C., separated for | | | | | |
|---|---|---|---|---|---|---|
| | Diesel Fuel Haltermann | | Diesel Fuel A | | Diesel Fuel B | |
| | After 5 min | After 10 min | After 5 min | After 10 min | After 5 min | After 10 min |
| Untreated Diesel fuel (no package) | 15 | 20 | 20 | 20 | | |
| Package AP4 (no antifoam, no demulsifier) | 0 | 0 | 0 | 0 | | |
| Package AP1 (complete package) | 1 | 3 | 5 | 13 | | |
| Package AP3 (no dem) + 15 ppm SD-12 | 2 | 17 | 19 | 20 | | |
| Package AP3 (no dem) + 15 ppm SD-11 | 1 | 14 | 18 | 20 | | |
| Package AP3 (no dem) + 15 ppm Example II | 0 | 15 | 14 | 19.5 | | |
| Package AP3 (no dem) + 15 ppm SD-13 | 6 | 10 | 17 | 20 | | |
| Untreated Diesel fuel (no package) | | | | | 20 | 20 |
| Package AP4 (no antifoam, no demulsifier) | | | | | 0 | 0 |
| Package AP1 (complete package) | | | | | 0 | 0 |
| Package AP3 (no dem) + 50 ppm SD-12 | | | | | 1 | 10 |
| Package AP3 (no dem) + 50 ppm SD-11 | | | | | 0 | 10 |
| Package AP3 (no dem) + 50 ppm Example II | | | | | 0 | 2 |
| Package AP3 (no dem) + 50 ppm SD-13 | | | | | 3 | 4 |

From Table 7 above, it is apparent that the untreated fuel separates from the water quickly compared to the diesel fuel treated with additive package AP4 (no antifoam and no demulsifier). This indicates that the surfactants present in the additive packages stabilize the water emulsion drops in diesel. The complete package (reference) AP1 should lead to the demulsification of the diesel quickly. AP1 was not very efficient for the different diesel fuels.

The four silicones showed all good demulsifying/dehazing properties compared to the reference (Fuel+package AP1) and Example II showed very good results with Diesel fuel A and diesel fuel package AP3, and good results for AP3 and diesel fuel Haltermann.

EXAMPLE XVIII

Phase Separation Study

Two kinds of crude oils from Russia were tested with bottle tests. Both of them contained hydrogen sulfide and other sulfur compounds. Demulsification was performed in plastic tubes for a first screening at ambient temperature (ca. 25° C.).

The demulsifiers were added as a 10 wt. % solution in methanol to 40 mL of crude oil in the tube and. For 100 ppm treat rate 40 microliters of this 10% solution was added. Then the demulsifier and the crude oil were shaken vertically by hand using the following procedure: 45 seconds shaking (two tubes per hand), 30 seconds pause used for opening the tubes for degassing and again 45 seconds shaking. The water separation was recorded after 15, 30, 60 and 120 minutes, respectively.

First, all the silicone based demulsifiers were tested with crude oil A which had a water cut of 30%, and a density of 0.953 g/cm$^3$ (API about 17). As reference, two organic demulsifiers, OD-8 and OD-9, were used which contained a blend of 3 to 4 different organic demulsifiers.

Table 8 shows the demulsification results of crude oil A after 2 h and 24 h demulsification, respectively, at ambient temperature.

TABLE 8

| N° | ppm | Water separation at 25° C. (mL) | | | | | % Separation after 2 h | % Separation after 24 h | Quality of interface |
| --- | --- | --- | --- | --- | --- | --- | --- | --- | --- |
| | | 15 min | 30 min | 60 min | 120 min | 24 h | | | |
| Neat crude oil A | na | 0 | 0 | 0 | 0 | 0 | 0 | 0 | na |
| OD-8 | 100 | 12 | 12 | 12 | 12 | 12 | 100 | 100 | soft |
| OD-9 | 100 | 0 | 0 | 0.5 | 0.5 | 10 | 4 | 83 | na |
| SD-11 | 100 | 10 | 10 | 10 | 10.5 | 11 | 88 | 92 | soft |
| Example II | 100 | 10 | 10.5 | 11 | 11 | 11 | 92 | 92 | hard |
| Example VI | 100 | 10 | 10 | 10 | 10 | 10.5 | 83 | 88 | hard |
| Example I | 100 | 5 | 10 | 10.5 | 10.5 | 10.5 | 88 | 88 | medium |
| SD-2 | 100 | 10 | 10 | 11 | 10.5 | 11 | 88 | 92 | medium |
| SD-5 | 100 | 0.5 | 10 | 11 | 11 | 11 | 92 | 92 | medium |

Table 9 shows the ranking of the different demulsifiers taking into account the 2 percentages of separation.

TABLE 9

| Ranking | N° | ppm | After 2 h (% separation) | After 24 h (% separation) | Quality of interface |
| --- | --- | --- | --- | --- | --- |
| 1 | OD-8 | 100 | 100 | 100 | soft |
| 2 | Example II | 100 | 92 | 92 | hard |
| 3 | SD-5 | 100 | 88 | 92 | medium |
| 4 | SD-11 | 100 | 88 | 92 | soft |
| 5 | SD-2 | 100 | 88 | 92 | medium |
| 6 | Example I | 100 | 88 | 88 | medium |
| 7 | Example VI | 100 | 83 | 88 | hard |
| 8 | OD-9 | 100 | 4 | 83 | na |

From the above results, Example II shows the best demulsification among the silicone based demulsifiers. In addition, all of the silicone based demulsifiers were more efficient than OD-9.

The best silicone based demulsifiers with Crude oil A above were tested again with crude oil B which had a water cut of 21%, and a density of 0.955 g/cm$^3$ (API about 17). For comparison organic demulsifiers OD-10 and OD-11 were tested, which were contained 3 to 4 different organic demulsifiers.

Table 10 shows the demulsification results of crude oil B after 2 h demulsification at ambient temperature (ca 25° C.).

TABLE 10

| N° | ppm | Water separation at 25° C. (mL) | | | | % Separation after 2 h | Quality of interface |
| --- | --- | --- | --- | --- | --- | --- | --- |
| | | 15 min | 30 min | 60 min | 120 min | | |
| Neat Crude oil B | na | 0 | 0 | 0 | 0 | 0 | na |
| OD-10 | 100 | 0.2 | 3 | 4.8 | 5 | 60 | soft |
| OD-11 | 100 | 0 | 0.2 | 3 | 4.5 | 54 | soft |
| Example II | 100 | 0 | 0.1 | 2 | 5 | 60 | hard |
| SD-2 | 100 | 0.1 | 0.5 | 4 | 5 | 60 | hard |
| SD-11 | 100 | 0.2 | 0.5 | 4 | 4.5 | 54 | soft |
| SD-10 | 100 | 2 | 4 | 4.9 | 5 | 60 | soft |
| SD-15 | 100 | 3 | 4 | 4 | 4.5 | 54 | medium |

Table 11 shows the ranking of the different demulsifiers taking into account the percentage of water separation after 2 hours demulsification and the quality of the oil/water phase after demulsification.

TABLE 11

| Ranking | N° | ppm | % separation After 2 h | Quality of interface |
| --- | --- | --- | --- | --- |
| 1 | OD-10 | 100 | 60 | soft |
| 2 | Example II | 100 | 60 | hard |
| 3 | SD-2 | 100 | 60 | hard |
| 4 | SD-10 | 100 | 60 | soft |
| 5 | OD-11 | 100 | 54 | soft |
| 6 | SD-11 | 100 | 54 | soft |
| 7 | SD-15 | 100 | 54 | medium |

For crude oil B, Example II, SD-2 and SD-10 were as good as the complete formulation of organics demulsifiers.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

The invention claimed is:

1. A composition comprising:
   a) a demulsifying-effective amount of a silicone demulsifier having a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxirane-containing and/or oxetane-containing groups, wherein said oxirane or oxetane is optionally ring-opened without polymerization by reaction with a chemical or group capable of ring-opening an oxirane or oxetane ring, respectively, except that an oxetane ring is not ring-opened with water;
   b) an aqueous phase; and
   c) an oil phase;
   wherein a solid filler is substantially excluded from the composition.

2. The composition of claim 1, further comprising one or more organic demulsifiers selected from hydrocarbon group-containing sulfonic acids, carboxylic acids, thiocarboxylic acids, carboxylic acid esters, phosphinic acids, sulfates, and phosphates; alkyleneoxide polymers or copolymers and their esters; alkyleneoxide-functionalized phenolic resins; epoxy resins; amine alkyleneoxides; polyimine alkoxylates; polyester amines; cationic surfactants; bis-amides; silicone-based polymers or copolymers lacking one of an ethylene oxide component, a propylene oxide component, or an epoxide-containing group; and salts thereof.

3. The composition of claim 1, wherein the one or more alkylene oxide groups are independently according to the formula $-X_z-(OCHRCH_2)_sOR^7$ wherein X is an optional linking group with z independently 0 or 1, R is independently selected for each alkylene oxide unit from hydrogen or a hydrocarbon group having one to three carbon atoms, $R^7$ is independently selected from the group consisting of hydrogen or a hydrocarbon group having one to twenty carbon atoms, and s is 1 or a higher integer.

4. The composition of claim 3, wherein R is independently selected for each alkylene oxide unit from either hydrogen or methyl.

5. The composition of claim 4, wherein at least one alkylene oxide group is an ethylene oxide-propylene oxide copolymer.

6. The composition of claim 3, wherein s is 10 or a higher integer.

7. The composition of claim 1, wherein the silicone demulsifier has a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxirane-containing groups.

8. The composition of claim 1, wherein the silicone demulsifier has a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxirane-containing groups ring-opened without polymerization by reaction with a chemical or group capable of opening an oxirane ring.

9. The composition of claim 1, wherein the silicone demulsifier has a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxetane-containing groups.

10. The composition of claim 1, wherein the silicone demulsifier has a molecular structure comprising a polysiloxane backbone of at least two siloxane units covalently bound to (i) one or more alkylene oxide groups comprising one or more unpolymerized alkylene oxide units independently having one to five carbon atoms, and (ii) one or more unpolymerized oxetane-containing groups ring-opened without polymerization by reaction with a chemical or group capable of opening an oxetane ring, except that the oxetane ring is not ring-opened with water.

11. The composition of claim 1, wherein the silicone demulsifier is according to the formula:

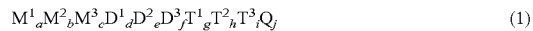

wherein:
$M^1 = R^1_3 SiO_{1/2}$;
$M^2 = R^1_k R^2_{(3-k)} SiO_{1/2}$; k=0, 1 or 2
$M^3 = R^1_l R^3_{(3-l)} SiO_{1/2}$; l=0, 1 or 2
$D^1 = R^1_2 SiO_{2/2}$;
$D^2 = R^1_m R^2_{(2-m)} SiO_{2/2}$; m=0 or 1
$D^3 = R^1_n R^3_{(2-n)} SiO_{2/2}$; n=0 or 1
$T^1 = R^1 SiO_{3/2}$;
$T^2 = R^2 SiO_{3/2}$;
$T^3 = R^3 SiO_{3/2}$;
$Q = SiO_{4/2}$ wherein $R^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; $R^2$ is according to the formula $-(CH_2)_p(OR^4)_q(OR^5)_rOR^6$ where p is a number of 0 to 5, and q and r are each independently a number of 0 to 100, provided that the sum of q and r is at least 1; $R^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively, except that an oxetane ring is not ring-opened with water; each of $R^4$ and $R^5$ independently represents a divalent hydrocarbon radical having one to five carbon atoms; $R^6$ is hydrogen or a linear or branched, cyclic or acyclic, saturated or unsaturated hydrocarbon group having one to twenty carbon atoms; a, b, c, d, e, f, g, h, i and j are each independently 0 or a positive integer, provided that (a+b+c) equals (2+g+h+i+2j), the sum (a+b+c+d+e+f+g+h+i+j) is equal to or greater than 3, the sum (g+h+i+j) is equal to or greater than 0 and less than or equal to 10, and the sums (b+e+h) and (c+f+i) are independently a number of 1 to 200.

12. The composition of claim 11, wherein the sum (a+b+c+d+e+f+g+h+i+j) is equal to or greater than 3 and less than or equal to 500.

13. The composition of claim 11, wherein the sum (a+b+c+d+e+f+g+h+i+j) is greater than 100.

14. The composition of claim 11, wherein the silicone demulsifier is according to the formula:

wherein $M^1 = R^1_3 SiO_{1/2}$; $D^1 = R^1_2 SiO_{2/2}$; $D^2 = R^1_m R^2_{(2-m)} SiO_{2/2}$, where m=0 or 1; $D^3 = R^1_n R^3_{(2-n)} SiO_{2/2}$, where n=0 or 1; $R^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; $R^2$ is according to the formula —$(CH_2)_p(OR^4)_q(OR^5)_rOR^6$, where one of $R^4$ and $R^5$ is represented by —$CH_2CH_2$— and another $R^4$ and $R^5$ by —$CH_2CH(CH_3)$— and where p is a number of 0 to 5, and q and r are each independently a number of 1 to 100; $R^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively; $R^6$ is hydrogen or a linear or branched, cyclic or acyclic, saturated or unsaturated hydrocarbon group having one to twenty carbon atoms; d is 0 or a higher number, and e and f are independently 1 or a higher number, such that the sum of d, e, and f is no greater than about 500.

15. The composition of claim 14, wherein $M^1=(CH_3)_3SiO_{1/2}$; $D^1=(CH_3)_2SiO_{2/2}$; $D^2=(CH_3)(R^2)SiO_{2/2}$, $D^3=(CH_3)(R^3)SiO_{2/2}$; $R^2$ is according to the formula —$(CH_2)_p(OR^4)_q(OR^5)_rOR^6$, where one of $R^4$ and $R^5$ is represented by —$CH_2CH_2$— and another $R^4$ and $R^5$ by —$CH_2CH(CH_3)$— and where p is a number of 0 to 5, and q and r are each independently a number of 1 to 100; $R^3$ is a monovalent hydrocarbon radical having one to twenty carbon atoms and one or more oxirane-containing and/or oxetane-containing groups, wherein said oxirane or oxetane is optionally ring-opened without polymerization by reaction with a suitable chemical or group capable of ring-opening an oxirane or oxetane ring, respectively; and $R^6$ is hydrogen or a linear or branched, cyclic or acyclic, saturated or unsaturated hydrocarbon group having one to twenty carbon atoms.

16. A composition comprising:
(a) a demulsifying-effective amount of silicone demulsifier having the formula $$M^1D^1_dD^2_eD^3_fM^1 \quad (2)$$

wherein $M^1=R^1_3SiO_{1/2}$; $D^1=R^1_2SiO_{2/2}$; $D^2=R^1_mR^2_{(2-m)}SiO_{2/2}$, where m=0 or 1; $D^3=R^1_nR^3_{(2-n)}SiO_{2/2}$, where n=0 or 1; $R^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; $R^2$ is according to the formula —$(CH_2)_p(OR^4)_q(OR^5)_rOR^6$, where one of $R^4$ and $R^5$ is represented by —$CH_2CH_2$— and another $R^4$ and $R^5$ by —$CH_2CH(CH_3)$— and where p is a number of 0 to 5, and q and r are each independently a number of 1 to 100; $R^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively, except that an oxetane ring is not ring-opened with water; $R^6$ is hydrogen or a linear or branched, cyclic or acyclic, saturated or unsaturated hydrocarbon group having one to twenty carbon atoms; d is 0 or a higher number, and e and f are independently 1 or a higher number, such that the sum of d, e, and f is no greater than about 500;
b) an aqueous phase; and
c) an oil phase
wherein a solid filler is substantially excluded from the composition.

17. A composition comprising:
(a) a demulsifying-effective amount of silicone demulsifier having the formula $$M^1_aM^2_bM^3_cD^1_dD^2_eD^3_fT^1_gT^2_hT^3_iQ_j \quad (1)$$

wherein:
$M^1=R^1_3SiO_{1/2}$;
$M^2=R^1_kR^2_{(3-k)}SiO_{1/2}$; k=0, 1 or 2
$M^3=R^1_lR^3_{(3-l)}SiO_{1/2}$; l=0, 1 or 2
$D^1=R^1_2SiO_{2/2}$;
$D^2=R^1_mR^2_{(2-m)}SiO_{2/2}$; m=0 or 1
$D^3=R^1_nR^3_{(2-n)}SiO_{2/2}$; n=0 or 1
$T^1=R^1SiO_{3/2}$;
$T^2=R^2SiO_{3/2}$;
$T^3=R^3SiO_{3/2}$;
$Q=SiO_{4/2}$
wherein $R^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; $R^2$ is according to the formula —$(CH_2)_p(OR^4)_q(OR^5)_rOR^6$ where p is a number of 0 to 5, and q and r are each independently a number of 0 to 100, provided that the sum of q and r is at least 1; $R^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively, except that an oxetane ring is not ring-opened with water; each of $R^4$ and $R^5$ independently represents a divalent hydrocarbon radical having one to five carbon atoms; $R^6$ is hydrogen or a linear or branched, cyclic or acyclic, saturated or unsaturated hydrocarbon group having one to twenty carbon atoms; a, b, c, d, e, f, g, h, i and j are each independently 0 or a positive integer, provided that (a+b+c) equals (2+g+h+i+2j), the sum (a+b+c+d+e+f+g+h+i+j) is greater than 100, the sum (g+h+i+j) is equal to or greater than 0 and less than or equal to 10, and the sums (b+e+h) and (c+f+i) are independently a number of 1 to 200;
b) an aqueous phase; and
c) an oil phase
wherein a solid filler is substantially excluded from the composition.

18. A method for separating emulsions of oil and water, the method comprising incorporating a demulsifying-effective amount of a silicone demulsifier into an emulsion comprising an oil phase and an aqueous phase, the silicone demulsifier having a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxirane-containing and/or oxetane-containing groups, wherein said oxirane or oxetane is optionally ring-opened without polymerization by reaction with a chemical or group capable of ring-opening an oxirane or oxetane ring, respectively, except that an oxetane ring is not ring-opened with water, and wherein a solid filler is substantially excluded from the silicone demulsifier and emulsion.

19. The method of claim 18, wherein the silicone demulsifier is combined with one or more organic demulsifiers selected from hydrocarbon group-containing sulfonic acids, carboxylic acids, thiocarboxylic acids, carboxylic acid esters, phosphinic acids, sulfates, and phosphates; alkyleneoxide polymers or copolymers and their esters; alkyleneoxide-functionalized phenolic resins; epoxy resins; amine alkyleneoxides; polyimine alkoxylates; polyester amines; cationic surfactants; bis-amides; silicone-based polymers or copolymers lacking one of an ethylene oxide component, a propylene oxide component, or an epoxide-containing group; and salts thereof.

20. The method of claim 18, wherein the one or more alkylene oxide groups are independently according to the formula —$X_Z$—(OCHRCH$_2$)$_s$OR$^7$ wherein X is an optional linking group with z independently 0 or 1, R is independently selected for each alkylene oxide unit from hydrogen or a hydrocarbon group having one to three carbon atoms, R$^7$ is independently selected from the group consisting of hydrogen or a hydrocarbon group having one to twenty carbon atoms, and s is 1 or a higher integer.

21. The method of claim 20, wherein R is independently selected for each alkylene oxide unit from either hydrogen or methyl.

22. The method of claim 21, wherein at least one alkylene oxide group is an ethylene oxide-propylene oxide copolymer.

23. The method of claim 20, wherein s is 10 or a higher integer.

24. The method of claim 18, wherein the silicone demulsifier has a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxirane-containing groups.

25. The method of claim 18, wherein the silicone demulsifier has a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxirane-containing groups ring-opened without polymerization by reaction with a chemical or group capable of opening an oxirane ring.

26. The method of claim 18, wherein the silicone demulsifier has a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxetane-containing groups.

27. The method of claim 18, wherein the silicone demulsifier has a molecular structure comprising a polysiloxane backbone of at least two siloxane units covalently bound to (i) one or more alkylene oxide groups comprising one or more alkylene oxide units independently having one to five carbon atoms, and (ii) one or more unpolymerized oxetane-containing groups ring-opened without polymerization by reaction with a chemical or group capable of opening an oxetane ring, except that the oxetane ring is not ring-opened with water.

28. The method of claim 18, wherein the silicone demulsifier is according to the formula:

$$M^1{}_a M^2{}_b M^3{}_c D^1{}_d D^2{}_e D^3{}_f T^1{}_g T^2{}_h T^3{}_i Q_j \quad (1)$$

wherein:
$M^1 = R^1{}_3 SiO_{1/2}$;
$M^2 = R^1{}_k R^2{}_{(3-k)} SiO_{1/2}$; k=0, 1 or 2
$M^3 = R^1{}_l R^3{}_{(3-l)} SiO_{1/2}$; l=0, 1 or 2
$D^1 = R^1{}_2 SiO_{2/2}$;
$D^2 = R^1{}_m R^2{}_{(2-m)} SiO_{2/2}$; m=0 or 1
$D^3 = R^1{}_n R^3{}_{(2-n)} SiO_{2/2}$; n=0 or 1
$T^1 = R^1 SiO_{3/2}$;
$T^2 = R^2 SiO_{3/2}$;
$T^3 = R^3 SiO_{3/2}$;
$Q = SiO_{4/2}$ wherein R$^1$ is independently selected from the group consisting of R$^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; R$^2$ is according to the formula —(CH$_2$)$_p$(OR$^4$)$_q$(OR$^5$)$_r$OR$^6$ where p is a number of 0 to 5, and q and r are each independently a number of 0 to 100, provided that the sum of q and r is at least 1; R$^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened by reaction with a suitable chemical or group capable of ring-opening an oxirane or oxetane ring without polymerazation, respectively, except that an oxetane ring is not ring-opened with water; each of R$^4$ and R$^5$ independently represents a divalent hydrocarbon radical having one to five carbon atoms; R$^6$ is hydrogen or a linear or branched, cyclic or acyclic, saturated or unsaturated hydrocarbon group having one to twenty carbon atoms; a, b, c, d, e, f, g, h, i and j are each independently 0 or a positive integer, provided that (a+b+c) equals (2+g+h+i+2j), the sum (a+b+c+d+e +f+g+h+i+j) is equal to or greater than 3, the sum (g+h+i+j) is equal to or greater than 0 and less than or equal to 10, and the sums (b+e+h) and (c+f+i) are independently a number of 1 to 200.

29. The method of claim 28, wherein the sum (a+b+c+d+e+f+g+h+i +j) is equal to or greater than 3 and less than or equal to 500.

30. The method of claim 28, wherein the sum (a+b+c+d+e+f+g+h+i +j) is greater than 100.

31. The method of claim 28, wherein the silicone demulsifier is according to the formula:

$$M^1 D^1{}_d D^2{}_e D^3{}_f M^1 \quad (2)$$

wherein $M^1 = R^1{}_3 SiO_{1/2}$; $D^1 = R^1{}_2 SiO_{2/2}$; $D^2 = R^1{}_m R^2{}_{(2-m)} SiO_{2/2}$, where m=0 or 1; $D^3 = R^1{}_n R^3{}_{(2-n)} SiO_{2/2}$ where n=0 or 1; R$^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; R$^2$ is according to the formula —(CH$_2$)$_p$(OR$^4$)$_q$(OR$^5$)$_r$OR$^6$, where one of R$^4$ and R$^5$ is represented by —CH$_2$CH$_2$— and another R$^4$ and R$^5$ by —CH$_2$CH(CH$_3$)— and where p is a number of 0 to 5, and q and r are each independently a number of 1 to 100; R$^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively; R$^6$ is hydrogen or a linear or branched, cyclic or acyclic, saturated or unsaturated hydrocarbon group having one to twenty carbon atoms; d is 0 or a higher number, and e and f are independently 1 or a higher number, such that the sum of d, e, and f is no greater than about 500.

32. The method of claim 28, wherein $M^1 = (CH_3)_3 SiO_{1/2}$; $D^1 = (CH_3)_2 SiO_{2/2}$; $D^2 = (CH_3)(R^2) SiO_{2/2}$, $D^3 = (CH_3)(R^3) SiO_{2/2}$; R$^2$ is according to the formula —(CH$_2$)$_p$(OR$^4$)$_q$(OR$^5$)$_r$ OR$^6$, where one of R$^4$ and R$^5$ is represented by —CH$_2$CH$_2$— and another R$^4$ and R$^5$ by —CH$_2$CH(CH$_3$)— and where p is a number of 0 to 5, and q and r are each independently a number of 1 to 100; R$^3$ is a monovalent hydrocarbon radical having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively; and R$^6$ is hydrogen or a linear or branched, cyclic or acyclic, saturated or unsaturated hydrocarbon group having one to twenty carbon atoms.

33. A method for separating emulsions of oil and water, the method comprising incorporating a demulsifying-effective amount of a silicone demulsifier into an emulsion comprising an oil phase and an aqueous phase, the demulsifier having the formula $$M^1 D^1_d D^2_e D^3_f M^1 \tag{2}$$

wherein M$^1$=R$^1_3$SiO$_{1/2}$; D$^1$=R$^1_2$SiO$_{2/2}$; D$^2$=R$^1_m$R$^2_{(2-m)}$SiO$_{2/2}$, where m=0 or 1; D$^3$=R$^1_n$R$^3_{(2-n)}$SiO$_{2/2}$ where n=0 or 1; R$^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; R$^2$ is according to the formula —(CH$_2$)$_p$(OR$^4$)$_q$(OR$^5$)$_r$OR$^6$, where one of R$^4$ and R$^5$ is represented by —CH$_2$CH$_2$— and another R$^4$ and R$^5$ by —CH$_2$CH(CH$_3$)— and where p is a number of 0 to 5, and q and r are each independently a number of 1 to 100; R$^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively, except that an oxetane ring is not ring-opened with water; R$^6$ is hydrogen or a linear or branched, cyclic or acyclic, saturated or unsaturated hydrocarbon group having one to twenty carbon atoms; d is 0 or a higher number, and e and f are independently 1 or a higher number, such that the sum of d, e, and f is no greater than about 500, and wherein a solid filler is substantially excluded from the silicone demulsifier and emulsion.

34. A method for separating emulsions of oil and water, the method comprising incorporating a demulsifying-effective amount of a silicone demulsifier into an emulsion comprising an oil phase and an aqueous phase, the demulsifier having the formula $$M^1_a M^2_b M^3_c D^1_d D^2_e D^3_f T^1_g T^2_h T^3_i Q_j \tag{1}$$

wherein:
M$^1$=R$^1_3$SiO$_{1/2}$;
M$^2$=R$^1_k$R$^2_{(3-k)}$SiO$_{1/2}$; k=0, 1 or 2
M$^3$=R$^1_l$R$^3_{(3-l)}$SiO$_{1/2}$; l=0, 1 or 2
D$^1$=R$^1_2$SiO$_{2/2}$;
D$^2$=R$^1_m$R$^2_{(2-m)}$SiO$_{2/2}$; m=0 or 1
D$^3$=R$^1_n$R$^3_{(2-n)}$SiO$_{2/2}$; n=0 or 1
T$^1$=R$^1$SiO$_{3/2}$;
T$^2$=R$^2$SiO$_{3/2}$;
T$^3$=R$^3$SiO$_{3/2}$;
Q=SiO$_{4/2}$ wherein R$^1$ is independently selected from the group consisting of hydrogen, halogen, linear or branched, cyclic or acyclic, saturated or unsaturated hydrocarbon groups having one to twenty carbon atoms and optionally heteroatom-substituted with one or more oxygen and/or nitrogen atoms; R$^2$ is according to the formula —(CH$_2$)$_p$(OR$^4$)$_q$(OR$^5$)$_r$OR$^6$ where p is a number of 0 to 5, and q and r are each independently a number of 0 to 100, provided that the sum of q and r is at least 1; R$^3$ is a linear or branched, cyclic or acyclic, saturated or unsaturated hydrocarbon group having one to twenty carbon atoms and one or more unpolymerized oxirane-containing and/or oxetane-containing groups, wherein said oxirane or oxetane is optionally ring-opened without polymerization by reaction with a suitable chemical or group capable of ring-opening an oxirane or oxetane ring, respectively, except that an oxetane ring is not ring-opened with water; each of R$^4$ and R$^5$ independently represents a divalent hydrocarbon radical having one to five carbon atoms; R$^6$ is hydrogen or a linear or branched, cyclic or acyclic, saturated or unsaturated hydrocarbon group having one to twenty carbon atoms; a, b, c, d, e, f, g, h, i and j are each independently 0 or a positive integer, provided that (a+b+c) equals (2+g+h+i+2j), the sum (a+b+c+d+e+f+g+h+i+j) is greater than 100, the sum (g+h+i+j) is equal to or greater than 0 and less than or equal to 10, and the sums (b+e+h) and (c+f+i) are independently a number of 1 to 200.

* * * * *